(12) United States Patent
Nádas et al.

(10) Patent No.: US 11,088,957 B2
(45) Date of Patent: Aug. 10, 2021

(54) HANDLING OF DATA PACKET TRANSFER VIA A PROXY

(71) Applicant: Telefonaktiebolaget LM Ericsson (publ), Stockholm (SE)

(72) Inventors: Szilveszter Nádas, Budapest (HU); Attila Mihály, Dunakeszi (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 58 days.

(21) Appl. No.: 16/344,161

(22) PCT Filed: Oct. 28, 2016

(86) PCT No.: PCT/EP2016/076107
§ 371 (c)(1),
(2) Date: Apr. 23, 2019

(87) PCT Pub. No.: WO2018/077426
PCT Pub. Date: May 3, 2018

(65) Prior Publication Data
US 2019/0334825 A1    Oct. 31, 2019

(51) Int. Cl.
| | | |
|---|---|---|
| *H04L 12/825* | (2013.01) | |
| *H04L 12/26* | (2006.01) | |
| *H04L 12/801* | (2013.01) | |

(52) U.S. Cl.
CPC ........ *H04L 47/263* (2013.01); *H04L 43/0829* (2013.01); *H04L 47/11* (2013.01);
(Continued)

(58) Field of Classification Search
CPC ... H04L 47/263; H04L 43/0829; H04L 47/11; H04L 47/12; H04L 47/18; H04L 47/25;
(Continued)

(56) References Cited

U.S. PATENT DOCUMENTS 6,496,477 B1 * 12/2002 Perkins ................... H04L 45/00
370/228
8,184,641 B2 * 5/2012 Alt ........................ H04L 29/125
370/395.54
(Continued)

FOREIGN PATENT DOCUMENTS

| EP | 1241837 A1 | 9/2002 |
| WO | 2004091151 A1 | 10/2004 |

(Continued)

OTHER PUBLICATIONS

Jain, A. et al., "Mobile Throughput Guidance Inband Signaling Protocol", Internet-Draft, Sep. 7, 2015, pp. 1-20, Internet-Draft, Internet Engineering Task Force.
(Continued)

*Primary Examiner* — Jay P Patel
(74) *Attorney, Agent, or Firm* — Coats + Bennett, PLLC (57) ABSTRACT

A system, method, node and computer program for transfer of downlink data packets from a server (120) to a client (100) across at least one first data packet transport domain (130) and at least one second data packet transport domain (140) is disclosed. The two data packet transport domains (130, 140) have different transport characteristics and are interconnected via at least one proxy (110). The server (120) is located in front of the first data packet transport domain (130) and the client (100) is located behind the second data packet transport domain (140). The method comprises sending, by the server (120), a data packet to the client (100) and sending, by the proxy (110), responsive to the reception of the data packet, an acknowledgement to the server (120) acknowledging the reception of the data packet or a failure to receive the data packet at the proxy (110). The method further comprises forwarding, by the proxy (110), the received data packet to the client (100) and deleting, by the proxy (110), after sending of the acknowledgement to the
(Continued)

server (120) and forwarding the received data packet to the client (100), the received data packet in the proxy (110) and determining, by the server (120), a delivery status of the data packet or a failure location in either of the two data packet transport domains (130, 140) based on acknowledgements received from the client (100) and/or the proxy (110).

23 Claims, 7 Drawing Sheets

(52) U.S. Cl.
CPC .............. *H04L 47/12* (2013.01); *H04L 47/18* (2013.01); *H04L 47/25* (2013.01); *H04L 47/193* (2013.01)

(58) Field of Classification Search
CPC ........... H04L 47/193; H04L 2001/0097; H04L 1/1874; H04L 1/1864; H04L 69/163; H04L 43/08; H04L 47/26; H04L 47/27; H04W 80/06
See application file for complete search history.

(56) References Cited

U.S. PATENT DOCUMENTS

| | | | | |
|---|---|---|---|---|
| 9,130,954 | B2* | 9/2015 | Joshi | H04L 67/1021 |
| 2004/0105433 | A1* | 6/2004 | Seo | H04L 65/1006 370/352 |
| 2008/0228772 | A1* | 9/2008 | Plamondon | G06F 16/9574 |
| 2010/0208663 | A1* | 8/2010 | Hirano | H04L 45/308 370/328 |
| 2011/0093600 | A1* | 4/2011 | Lee | H04L 67/148 709/228 |
| 2013/0057639 | A1* | 3/2013 | Ralston | H04N 21/4728 348/14.02 |
| 2014/0283000 | A1* | 9/2014 | Radhakrishnan | H04L 63/1408 726/12 |
| 2015/0006625 | A1* | 1/2015 | Lee | H04L 47/25 709/203 |
| 2015/0067819 | A1* | 3/2015 | Shribman | H04L 67/2838 726/12 |
| 2016/0359681 | A1* | 12/2016 | McGleenon | H04L 69/326 |
| 2017/0078348 | A1* | 3/2017 | McGinnity | H04N 21/23418 |
| 2017/0078451 | A1* | 3/2017 | Wills | H04L 47/2441 |
| 2017/0373804 | A1* | 12/2017 | Han | H04W 4/70 |

FOREIGN PATENT DOCUMENTS

| | | | | |
|---|---|---|---|---|
| WO | WO-2014131153 | A1 * | 9/2014 | ........... H04L 67/145 |
| WO | WO-2017078715 | A1 * | 5/2017 | ......... H04L 47/2441 |

OTHER PUBLICATIONS

Ford, B. et al., "Breaking Up the Transport Logjam", Seventh ACM Workshop on Hot Topics in Networks (HotNets-VII), Calgary, Alberta, Canada, Oct. 6, 2008, pp. 1-6, ACM, obtained from Internet: bford.info/pub/net/logjam.pdf.

Balakrishnan, H. et al., "A Comparison of Mechanisms for Improving TCP Performance Over Wireless Links", ACM SIGCOMM '96, Standford, California, USA, Aug. 1, 1996, pp. 1-14, ACM.

Dong, M. et al., "PCC: Re-Architecting Congestion Control for Consistent High Performance", Oct. 11, 2014, pp. 1-14, Proceedings of the 12th USENIX Symposium on Networked Systems Design and Implementation (NSDI '15), obtained from internet: https://www.usenix.org/system/files/conference/nsdi15/nsdi15-paper-dong.pdf.

Balakrishnan, H. et al., "TCP Performance Implications of Network Path Asymmetry", RFC 3449, Dec. 1, 2002, pp. 1-41, Network Working Group, The Internet Society.

Border, J. et al., "Performance Enhancing Proxies Intended to Mitigate Link-Related Degradations", RFC 3135, Jun. 1, 2001, pp. 1-45, Network Working Group, The Internet Society.

Cobb, J. et al., "Congestion or Corruption? A Strategy for Efficient Wireless TCP Sessions", IEEE Symposium on Computers and Communications, Alexandria, Egypt, Jul. 27, 1995, pp. 262-268, IEEE.

Ott, J. et al., "Extended RTP Profile for Real-Time Transport Control Protocol (RTCP)—Based Feedback (RTP/AVPF)", RFC 4585, Jul. 1, 2006, pp. 1-51, Network Working Group, The Internet Society.

Diab, O. et al., "CS244 '15: Evaluating PCC: Re-Architecting Congestion Control for High Performance", May 29, 2015, pp. 1-16, retrieved on Mar. 25, 2019, retrieved from internet: https://reproducingnetworkresearch.wordpress.com/2015/05/29/cs244-15-evaluating-pcc-re-architecting-congestion-control-for-high-performance/.

* cited by examiner

Figure 5, proxy

Figure 6a, server

Figure 6b, server

Figure 6c, server

Figure 7

Figure 8

HANDLING OF DATA PACKET TRANSFER VIA A PROXY

TECHNICAL FIELD

The present invention relates to telecommunications and in particular to a system, method, node and computer program for handling of transfer of downlink data packets from a server to a client via a proxy node.

BACKGROUND

The data packet transport protocol most commonly used today is TCP (Transmission Control Protocol). Therefore, on many of today's transport bottlenecks fairness is provided by TCP's congestion control algorithm.

TCP is a reliable transport protocol tuned to perform well in traditional networks where congestion is the primary cause of packet loss. However, networks with wireless links and mobile hosts may incur significant losses due to radio bit errors and handoff. In the presence of the high bit-error rates, intermittent connectivity and handoffs characteristic of wireless environments, TCP reacts to packet losses as it would in the wired environment. TCP drops its transmission window size before retransmitting packets, initiates congestion control or avoidance mechanisms and resets its retransmission timer. This causes TCP to produce suboptimal throughput and congestion control behavior for wireless links where no optimizations are applied.

From another viewpoint, due to this compatibility requirement, it is difficult to design access networks that assume a different congestion control algorithm than TCP. This could, however, be beneficial, since such alternative congestion control algorithm could use small buffers and therefore provide lower data packet delays. It could also use a simplified network (e.g. Radio Access Network, RAN) algorithm design lowering potential data packet delivery jitter.

Some access domains, as the cellular networks today, control resource sharing and thus they do not require a TOP-like congestion control. This could make it possible to use a different congestion control algorithm than TCP and consequently providing better efficiency, e.g., if the congestion control provides a faster adaptation to fast changing bottlenecks, this would result in higher overall throughput. Or, if a faster slow-start is used than that in the current TCP, then a faster download response times can be achieved for small content transfer.

Figure 1:
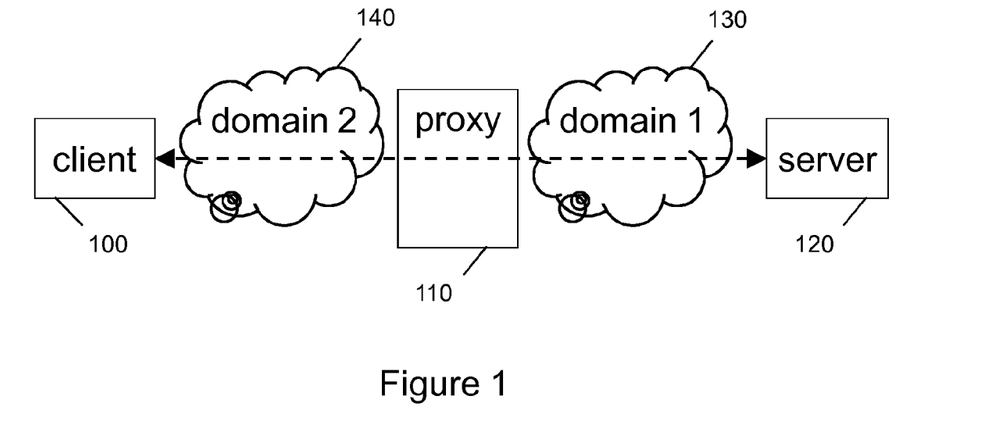
FIG. 1 shows a diagram illustrating a system for handling of transfer of downlink data packets from a server to a client via a proxy.

The main problem with changing the congestion control algorithm in the end-to-end transport protocol is that some domains on the path may still require TCP-friendly functionality for fairness. This is illustrated in FIG. 1, where the traffic crosses two domains, domain 1 where data packet loss/reordering means congestion, and a domain 2 where data packet loss/reordering can happen independently of congestion—and resource sharing is controlled by that domain.

The desired goal would thus would be to achieve the advantageous behavior in domain 2 by a specific congestion control behavior (allowing for moderate loss, fast start and fast adaptation), but keeping the expected behavior in domain 1 (TCP fairness, low loss, and slow start).

SUMMARY

There is a clear need for an improved handling of transfer of downlink data packets from a server to a client across a first data packet transport domain and a second data packet transport domain. The two data packet transport domains have different transport characteristics and are interconnected via one or more a proxy nodes.

A solution may be a split-connection approach that completely hides the domain 2 characteristics (e.g. the wireless link) from the sender by terminating the TCP connection by a proxy node (also known as Performance Enhancing Proxy (PEP)) that in turn opens up a separate transport protocol connection towards the destination. Proxy nodes could be beneficial because they represent a single point of control in the network, and therefore can select the most appropriate transport protocols with the most appropriate parameter settings towards the endpoints for optimal transport protocol performance, based on intrinsic information, that is not available to the endpoints.

However, a proxy node terminating the TCP connection requires local storing of unacknowledged packets and causes an increase of the end-to-end round-trip-time due to additional processing delays. Also for end-to-end encrypted traffic such hard split of the connection is problematic.

In the present application the end-to-end transport enhancement is based on the feedback of a proxy node placed at the domain border between the two domains. The proxy node positively acknowledges or negatively acknowledges downlink data packets received from the server, which enables the server to identify in which domain the data packet loss has happened.

If a data packet is acknowledged by the proxy node and not acknowledged by the client, then that data packet was lost in the domain 2 behind the proxy node. If a data packet is not acknowledged from either, it was lost between the proxy node and the server. The server may apply a congestion control algorithm that takes into account this additional information to improve the overall end-to-end performance, e.g. slow start may be clocked by proxy node acknowledgements, and downlink data packets lost behind the proxy node may result in a less aggressive congestion control algorithm response.

This object is achieved by the independent claims. Advantageous embodiments are described in the dependent claims.

According to an exemplary aspect of the invention, a method for transfer of downlink data packets from a server to a client across at least one first data packet transport domain and at least one second data packet transport domain is disclosed. The two data packet transport domains have different transport characteristics and are interconnected via at least one proxy. The server is located in front of the first data packet transport domain and the client is located behind the second data packet transport domain. The method comprises sending, by the server, a data packet to the client and sending, by the proxy, responsive to the reception of the data packet, an acknowledgement to the server acknowledging the reception of the data packet or a failure to receive the data packet at the proxy. The method further comprises forwarding, by the proxy, the received data packet to the client and deleting, by the proxy, after sending of the acknowledgement to the server and forwarding the received data packet to the client, the received data packet in the proxy. The method also comprises determining, by the server, a delivery status of the data packet or a failure location in either of the two data packet transport domains, based on acknowledgements received from the client and/or the proxy.

According to another exemplary aspect of the invention, a method in a server for transfer of downlink data packets from the server to a client across at least one first data packet transport domain and at least one second data packet transport domain is disclosed. The two data packet transport domains have different transport characteristics and are interconnected via at least one proxy. The server is located in front of the first data packet transport domain and the client is located behind the second data packet transport domain. The method comprised sending a data packet to the client and determining a delivery status of the data packet or a failure location in either of the two data packet transport domains, based on acknowledgements received from the client and/or the proxy.

According to another exemplary aspect of the invention, a method in a proxy, for transfer of downlink data packets from a server to a client across at least one first data packet transport domain and at least one second data packet transport domain is disclosed. The two data packet transport domains have different transport characteristics and are interconnected via the at least one proxy. The server is located in front of the first data packet transport domain and the client is located behind the second data packet transport domain. The method comprises receiving a data packet from the server and sending, responsive to the reception of the data packet, an acknowledgement to the server acknowledging the reception of the data packet or a failure to receive the data packet at the proxy. The method further comprises forwarding the received data packet to the client and deleting, after sending of the acknowledgement to the server and forwarding the received data packet to the client, the received data packet in the proxy.

According to another exemplary aspect of the invention, a server for transfer of downlink data packets from the server to a client across at least one first data packet transport domain and at least one second data packet transport domain is disclosed. The two data packet transport domains have different transport characteristics and are interconnected via at least one proxy. The server is located in front of the first data packet transport domain and the client is located behind the second data packet transport domain. The server is capable of sending a data packet to the client and determining a delivery status of the data packet or a failure location in either of the two data packet transport domains, based on acknowledgements received from the client and/or the proxy.

According to another exemplary aspect of the invention, a server apparatus for transfer of downlink data packets from the server apparatus to a client across at least one first data packet transport domain and at least one second data packet transport domain is provided. The two data packet transport domains have different transport characteristics and are interconnected via at least one proxy. The server apparatus is located in front of the first data packet transport domain and the client is located behind the second data packet transport domain. The server apparatus comprises a processor and a memory, said memory containing instructions executable by said processor whereby said apparatus is operative to send a data packet to the client and to determine a delivery status of the data packet or a failure location in either of the two data packet transport domains, based on acknowledgements received from the client and/or the proxy.

According to another exemplary aspect of the invention, a proxy for transfer of downlink data packets from a server to a client across at least one first data packet transport domain and at least one second data packet transport domain is disclosed. The two data packet transport domains have different transport characteristics and are interconnected via the at least one proxy. The server is located in front of the first data packet transport domain and the client is located behind the second data packet transport domain. The proxy is capable of receiving a data packet from the server and sending, responsive to the reception of the data packet, an acknowledgement to the server acknowledging the reception of the data packet or a failure to receive the data packet at the proxy. The proxy is further capable of forwarding the received data packet to the client and deleting, after sending of the acknowledgement to the server and forwarding the received data packet to the client, the received data packet in the proxy.

According to another exemplary aspect of the invention, a proxy apparatus for transfer of downlink data packets from a server to a client across at least one first data packet transport domain and at least one second data packet transport domain is provided. The two data packet transport domains have different transport characteristics and are interconnected via the at least one proxy apparatus. The server is located in front of the first data packet transport domain and the client is located behind the second data packet transport domain. The proxy apparatus comprises a processor and a memory, said memory containing instructions executable by said processor whereby said apparatus is operative to receive a data packet from the server and to send, responsive to the reception of the data packet, an acknowledgement to the server acknowledging the reception of the data packet or a failure to receive the data packet at the proxy apparatus. The proxy apparatus is further operative to forward the received data packet to the client and to delete, after sending of the acknowledgement to the server and forwarding the received data packet to the client, the received data packet in the proxy apparatus.

According to another exemplary aspect of the invention, a system for transfer of downlink data packets from a server to a client across at least one first data packet transport domain and at least one second data packet transport domain is disclosed. The two data packet transport domains have different transport characteristics and are interconnected via at least one proxy. The server is located in front of the first data packet transport domain and the client is located behind the second data packet transport domain. The system comprises the server, at least one proxy and the client as disclosed herein.

Also provided is a computer program product comprising program code portions to perform the steps of any of the methods presented herein when executed on one or more processors. The computer program product may be stored on computer readable recording medium such as a semiconductor memory, DVD, and so on. The computer program product may also be provided for download via a communication connection.

The foregoing and other objects, features and advantages of the present invention will become more apparent in the following detailed description of embodiments of the invention illustrated in the accompanying drawings.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein:

FIGS. 2-4 show a signaling flow for transfer of downlink data packets from a server to a client via a proxy; where:

DETAILED DESCRIPTION

In the following, a system, methods, nodes, and computer programs for handling of transfer of downlink data packets from a server to a client via a proxy according to the invention are described in more detail.

Within the context of the present application, the term "client" refers to a piece of computer hardware/device or software that accesses a service made available by a server. Typically the server is on another computer system, in which case the client accesses the service by way of a data packet transport network. The term applies to the role that software or devices play in a client-server model. The client may also be located in a terminal or mobile phone.

Within the context of the present application, the term "server" refers to software or a computer hardware/device that provides functionality for other programs or devices, called clients. This architecture is called the client-server model, and a single overall computation is distributed across multiple processes or devices. Servers can provide various functionalities, often called "services", such as sharing data or resources among multiple clients, or performing computation for a client. A single server can serve multiple clients, and a single client can use multiple servers. A client process may run on the same device or may connect over a data packet network to a server on a different device. Typical servers are database servers, file servers, mail servers, print servers, web servers, game servers, and application servers. Client-server systems are most frequently implemented by the request-response model: a client sends a request to the server, which performs some action and sends a response back to the client, typically with a result or acknowledgement.

Within the context of the present application, the term "proxy" refers to computer system or an application that acts as an intermediary for requests from clients seeking resources from servers. A client interfaces to the proxy, requesting some service, such as a file, connection, web page, or other resource available from a server and the proxy evaluates the request as a way to simplify and control its complexity. Proxies were targeted to add structure and encapsulation to distributed systems. Today, typical proxies are web proxies, facilitating access to content on the World Wide Web and providing separation between domains. A special category of proxy is a so called transport proxy, where the proxy limits its evaluation of the requests on the transport layers, and by that avoiding any interference with the application layers. A specific example of a transport proxy is a performance enhancing proxy (PEP) which is a network agent designed to improve the end-to-end performance of communications protocol. Standards describing a PEP are defined in RFC 3135 (PEPs intended to mitigate link-related degradations) and RFC 3449 (TCP performance implications of network path asymmetry).

Within the context of the present application, the term "packet transport domain", or simply "domain" refers to a section of a network under a common administration having same or similar purpose and characteristics. Examples of packet transport domain are radio access networks, core networks, or service network.

Within the context of the present application, the term "data packet" refers to a unit of data made into a single package that travels along a network path. Data packets are used in Internet Protocol (IP) transmissions for data that navigates the Web, and in other kinds of transport networks. A data packet typically has other parts besides the raw data it contains—often referred to as the payload. Data packets also have headers that carry certain types of metadata, along with routing information, such as a sequence numbering. For example, IP data packets have a header containing an IP address of the origin and an IP address of the destination.

Within the context of the present application, the term "downlink" refers to the direction from the server towards the client in the client-server model. Consequently, "uplink" refers to the opposite direction.

Within the context of the present application, the term "congestion control" refers to a modulation of traffic entry into a data packet transport network in order to avoid congestive collapse resulting from oversubscription. This is typically accomplished by reducing the rate of packets or the number of parallel data packet in flight. Congestion control should not be mixed with flow control, which prevents the sender from overwhelming the receiver. TCP uses a network congestion—avoidance algorithm that includes various aspects of an additive increase/multiplicative decrease (AIMD) algorithm, with other schemes such as slow-start and congestion window to achieve congestion avoidance. The TCP congestion—avoidance algorithm is the primary basis for congestion control in the Internet. There are several variations and versions of the algorithm implemented and in use on the Internet.

Within the context of the present application, the term "transport characteristics" refers to characteristics of a data packet transport network such as data packet delay, data packet jitter, data packet loss, capacity, congestion control method, or error correction method.

Within the context of the present application, the term "connection establishment" refers to the steps of building up an association between a server and a client in connection-oriented communication. Connection-oriented communication is a network communication mode in telecommunications and computer networking, where a communication session or a semi-permanent connection is established before any useful data can be transferred, and where a stream of data is delivered in the same order as it was sent (a.k.a. in-sequence delivery). The alternative to connection-oriented transmission is connectionless communication, for example the datagram mode communication used by the IP and UDP protocols, where data may be delivered out of order, since different packets are routed independently, and may be delivered over different paths. Connection-oriented communication may be a circuit switched connection, or a packet-mode virtual circuit connection. In the latter case, it may use either a transport layer virtual circuit protocol such as the TCP protocol, allowing data to be delivered in order, although the lower layer switching is connectionless, or it may be a data link layer or network layer switching mode, where all data packets belonging to the same traffic stream are delivered over the same path, and traffic flows are identified by some connection identifier rather than by complete routing information, allowing fast hardware based switching. Connection-oriented protocol services are often, but not always, reliable network services that provide acknowledgment after successful delivery, and automatic repeat request functions in case of missing data or detected bit-errors. ATM, Frame Relay and MPLS are examples of a connection-oriented, unreliable protocol.

For example, to establish a connection, TCP uses a three-way handshake. Before a client attempts to connect with a server, the server must first bind to and listen at a port to open it up for connections: this is called a passive open. Once the passive open is established, a client may initiate an active open. To establish a connection, the three-way (or 3-step) handshake occurs:
1) SYN: The active open is performed by the client sending a SYN to the server. The client sets the segment's sequence number to a random value A.
2) SYN-ACK: In response, the server replies with a SYN-ACK. The acknowledgment number is set to one more than the received sequence number i.e. A+1, and the sequence number that the server chooses for the packet is another random number, B.
3) ACK: Finally, the client sends an ACK back to the server. The sequence number is set to the received acknowledgement value i.e. A+1, and the acknowledgement number is set to one more than the received sequence number i.e. B+1.

At this point, both the client and server have received an acknowledgment of the connection. The steps 1, 2 above establish the connection parameter (sequence number) for one direction and it is acknowledged. The steps 2, 3 establish the connection parameter (sequence number) for the other direction and it is acknowledged. With these, a full-duplex communication is established.

Now turning to the figures.

Referring to FIG. 1, this figure shows a diagram illustrating a system for handling of transfer of downlink data packets from a server to a client via a proxy.

A client 100 is located or roaming in a second data packet transport domain 140 and is requesting a service from a server 120 located or roaming in a first data packet transport domain 130. The first data packet transport domain 130 and the second data packet transport domain 140 are interconnected via at least one proxy 110, for brevity only a single proxy 110 is depicted. Although just a single first data packet transport domain 130 is depicted in the figure, the first data packet transport domain 130 may comprise multiple separate packet transport domains which are for brevity reasons abstracted to a single transport domain. The same approach applies for the second data packet transport domain 140, the second data packet transport domain 140 may comprise multiple separate packet transport domains which are for brevity reasons abstracted to a single transport domain.

The proxy 110 is used to separate the two data packet transport domains 130, 140 and it is assumed that the two data packet transport domains 130, 140 have different transport characteristics. The transport characteristics of the two data packet transport domains 130, 140 may differ at least in one of a data packet loss ratio and an available bandwidth. For example, the first data packet transport domain 130 may be the Internet and the server 120 is a server offering services and is connected to the Internet. The second data packet transport domain 140 may be a radio access network such as WCDMA (or 3G) or LTE (Long Term Evolution, or 4G) RAN and the client 100 may be a mobile terminal (or also called user equipment, UE) roaming or located within the radio coverage area of that radio access network and being connected thereto. The second data packet transport domain 140 may provide downlink resource sharing among different downlink data packet flows. This means that the available transport resources of the second data packet transport domain 140 (which may be radio access network) are sliced (or sub-divided) and downlink data packet flows may be dynamically allocated to such resource slices. In consequence this may result into congestion appearing in such dynamically allocated slice, although the second data packet transport domain 140 as such is not in a congestion state. So the congestion may be an issue local to the allocated transport resources, or, the other way round, a congestion indication received responsive to downlink traffic shall not be interpreted as congestion of the entire second data packet transport domain 140.

The server 120 is located in front of the first data packet transport domain 130 and the client 100 is located behind the second data packet transport domain 140.

In an embodiment, the client 100 would access the server 120 for requesting a service. The transfer of the data packets from the server 120 to the client 100 may be done within a connection established via a connection establishment protocol between the server 120 and the client 100. For the purpose of data exchange between the client 100 and the server 120, the client may use the commonly used TCP protocol to establish a connection between the client 100 and the server 120. Such connection is shown in the figure as a dashed line and data packets would be exchanged in bidirectional way. The TCP protocol would ensure that the packets would be delivered in-sequence, wherein each data packet has a unique sequence number stepped up in the flow of the sequence. It is to be noted that although TCP ensures in-sequence delivery at both ends, at any point within the connection the data packets may appear in a different order. This is due to the fact that routing is applied to each data packet individually, resulting into different data packets potentially taking different routing paths.

The proxy 110 is located between the first and the second data packet transport domain 130, 140 and the data packets sent downlink from the server 120 would traverse the proxy 110 on the way towards the client 100. However, since there may be multiple proxies 110 located between the first and the second data packet transport domain 130, 140, an uplink response from the client 100 to the server 120 may traverse the same proxy 110 as the downlink data packet, or also a different proxy.

It is to be noted that the proxy 110 sits on the transport path of the data packets, however, the proxy 110 would not terminate or interfere in any way with the established connection between the client 100 and the server 120. So in terms of the established connection, the proxy 110 is transparent for the client 100 and the server 120.

However, in this application the proxy 100 still interacts with the server 120 for handling of transfer of downlink data packets from the server 120 to the client 100. This interaction is further described in the embodiments of the further figures.

Figure 2:
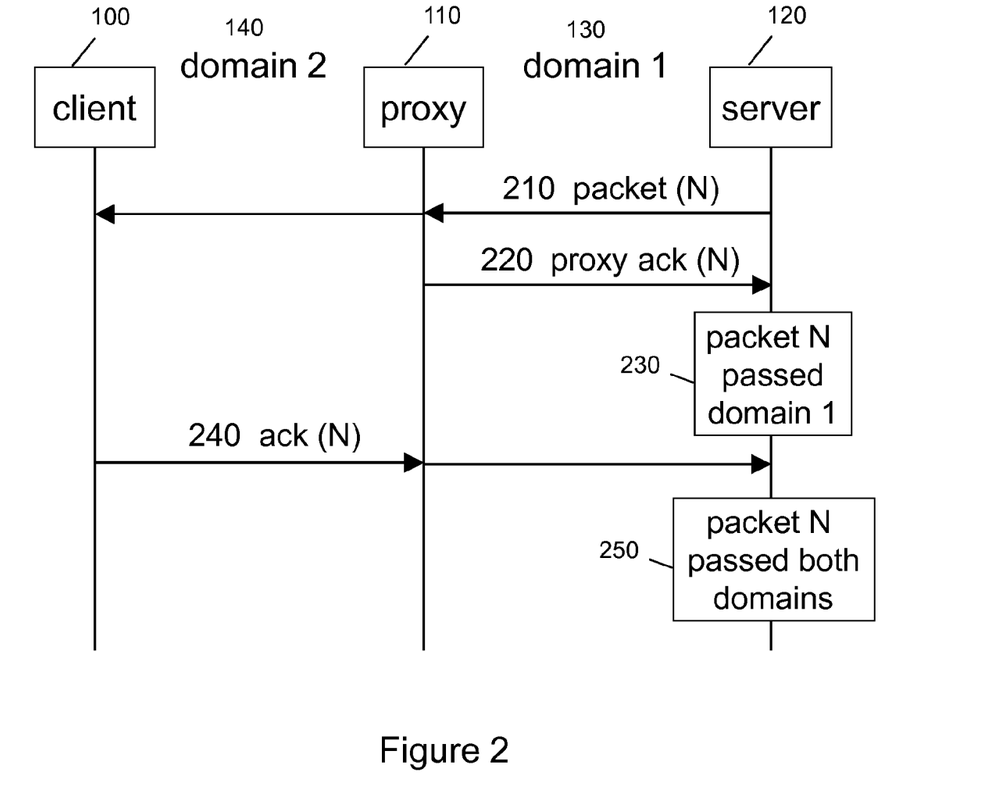
FIG. 2 illustrates the positive case where the data packet successfully traverses domain 1 and domain 2, FIG. 3.
Figure 3:
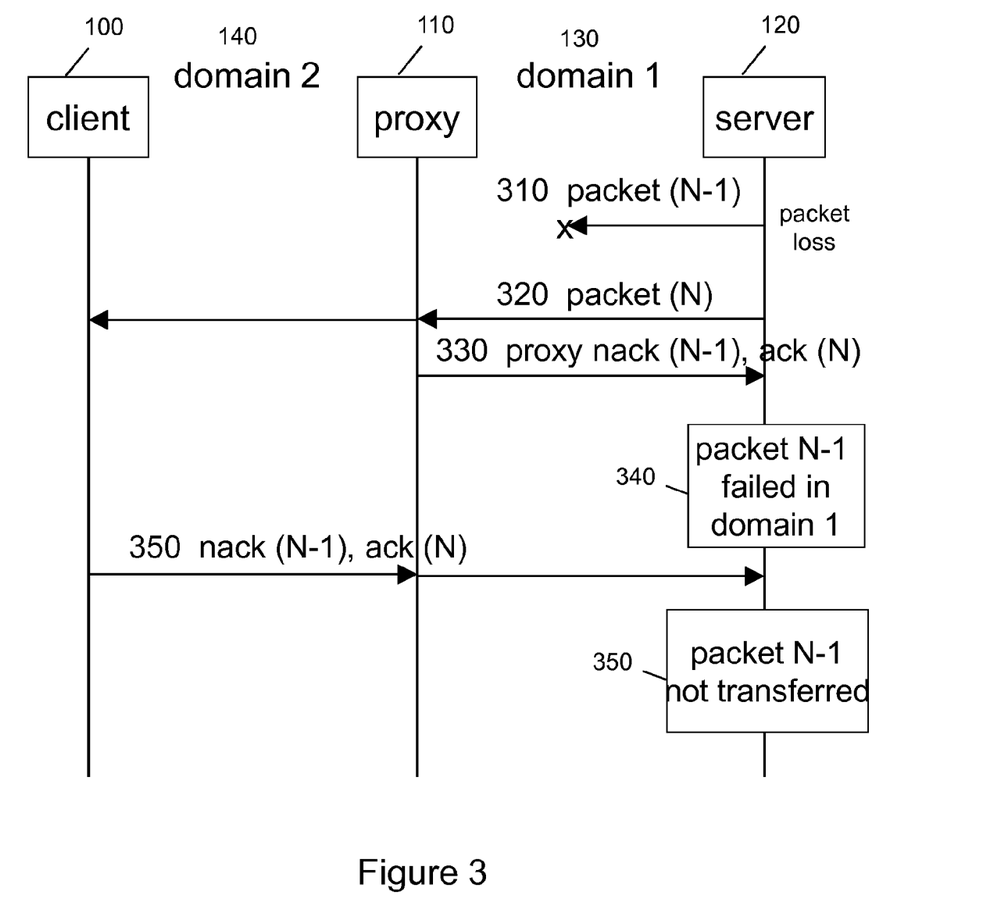
FIG. 3 illustrates the negative case if a data packet is lost in domain 1.
Figure 4:
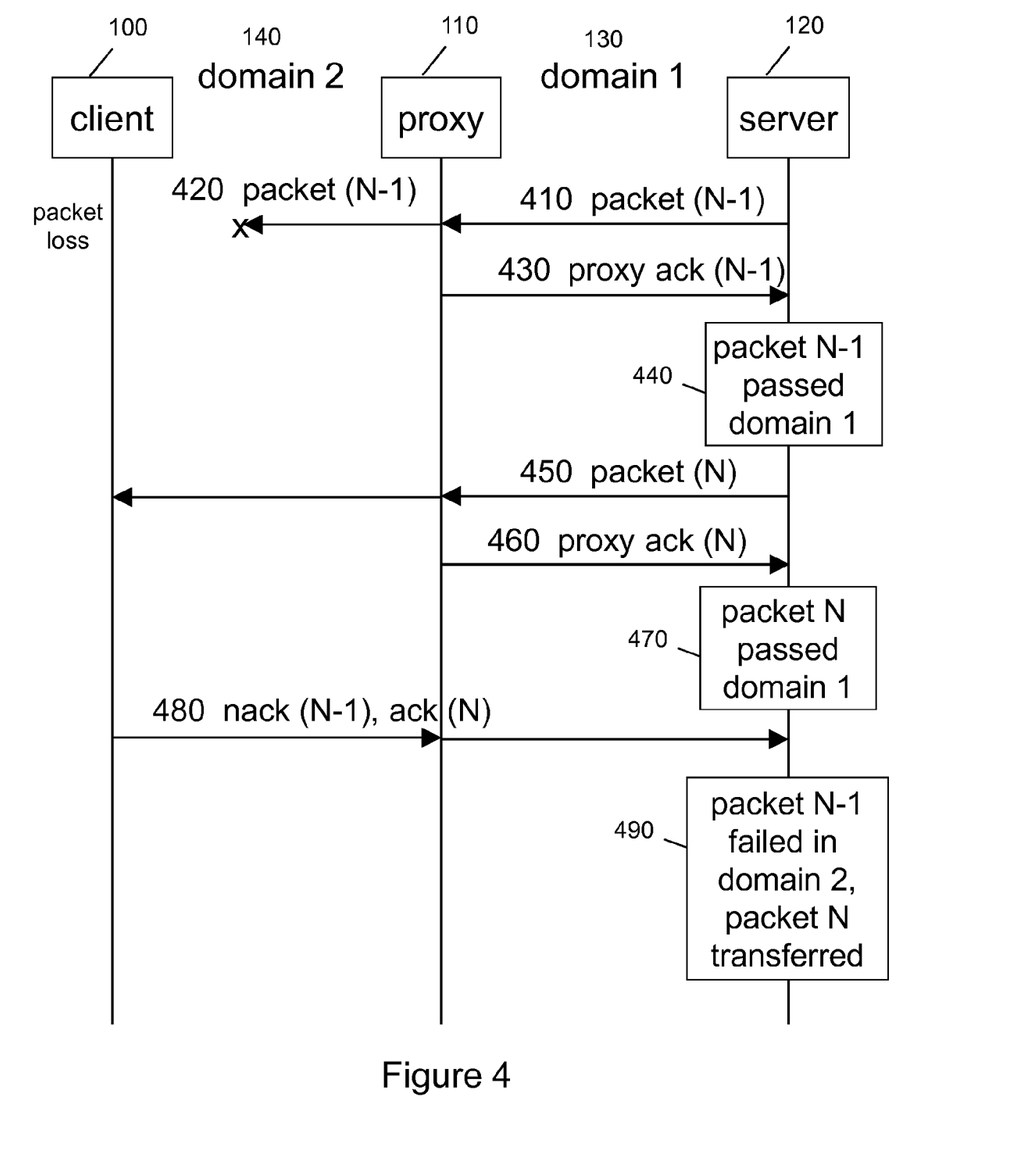
FIG. 4 illustrates the negative case if a data packet is lost in domain 2.

Referring to FIGS. 2-4, these figures show signaling flows for transfer of downlink data packets from the server 120 to the client 100 via a proxy 110. In particular, FIG. 2 illustrates the "positive case" where the data packet successfully traverses domain 1 130 and domain 2 140.

The flows in FIGS. 2-4 assumes that a connection between the client 100 and the server 120 was established already and therefore focus is on the delivery of a data packet from the server 120 to the client 100. The proxy 110 would be transparent to the data packets sent by the connection establishment protocol.

The flow starts in step 210 where the server 120 sends off a data packet to the client 100. This data packet is denoted as N, meaning that the data packet carries a sequence number of N. Consequently, a data packet denoted as N+1 would be the next data packet in the sequence. The data packet N is then received by the proxy 110. This means that the underlying routing mechanism of the transport network of the domain 1 130 routes the data packet N to the proxy 110. Alternatively, there may be a direct or tunneled connectivity between the server 120 and the proxy 110.

The proxy 110 receives the data packet N and immediately forwards the data packet N unmodified toward the destination across the transport network of the domain 2 140. The destination would be the client 100.

In step 220 the proxy 110 sends, responsive to the reception of the data packet N, an acknowledgement to the server 120 acknowledging the reception of the data packet. This acknowledgement is denoted here as "ack" (for acknowledgement) and relates to the reception of data packet N. The response is therefore denoted as "proxy ack (N)" in order to indicate that this is a response generated by the proxy 110, it is a positive acknowledgement, and it acknowledges the reception of data packet N.

The proxy 110 may generate a local copy of the data packet for generating the acknowledgement to the server 120. This ensures that a received data packet is immediately forwarded, so the forwarding delay caused by the proxy 110 would be minimized. Any acknowledgement may then be based on this local copy of the received data packet. This local copy may be produced within the proxy 110 by simple copying (mirroring) of the received data packet, or by doing an optical split of the downlink data packet stream where the one optical split result is forwarded and the second optical result of the split would be used for local analysis and generation of acknowledgments.

In a next step (not denoted in the figure) the proxy 110 may delete, after sending of the acknowledgement to the server 120 and forwarding the received data packet N to the client 100, the received data packet N in the proxy 110. However, the proxy 110 may still store information indicating that data packet N has been acknowledged. This may be done by the proxy 110 by keeping a list (or a ring buffer of certain length) of sequence numbers of data packet that have been acknowledged, or by simply stepping up a sequence number counter.

So the server 120 receives the positive acknowledgement for data packet N. Consequently, in step 230, the server 230 can derive from this positive acknowledgement for data packet N that data packet N has successfully passed transport domain 1 130.

Finally the data packet N reaches the client 100 and the client 100 would acknowledge in step 240 the reception of data packet N towards the server 120. This positive acknowledgement is denoted "ack (N)" indicating that this is a positive acknowledgement for the reception of data packet N at the client 100.

This Ack (N) indication is routed via transport domain 1 and transport domain 2 to the server 120. It shall be noted that due to the dynamic routing, the acknowledgement may traverse a different proxy than the proxy 110, since there may be more than one proxy between the two data packet transport domains 130, 140. For simplicity reasons the figures show the case that the acknowledgement traverses the proxy 110 on the way back to the server 120. The acknowledgement passes the proxy 110 transparently, so unchanged and without the proxy 110 taking any actions on this event.

Finally the acknowledgement is received by the server 120. In step 250 the server 120 can then draw the final conclusion on the delivery status of the data packet N. Since the server 120 received a positive acknowledgement from the proxy 110, and a positive acknowledgement from the client 100. This means that the data packet N has successfully passed both domains 130, 140.

So the server 120 would determine a delivery status of the data packet or a failure location in either of the two data packet transport domains 130, 140, based on acknowledgements received from the client 100 and/or the proxy 110.

This allows the server 120 to maintain an independent congestion control algorithm for downlink data packets for the first data packet transport domain 130 and the second data packet transport domain 140. So the server 120 may determine, based on the acknowledgements received from the client 100 and/or the proxy 110, an input to at least one of the two congestion controls.

This congestion control algorithm may be one of a window based congestion control algorithm or a rate based congestion control algorithm. Window based congestion control may mean that the server 120 limits the number of parallel packet "in-flight" downlink within that time window. Rate based congestion control may mean that the server 120 limits the rate at which data packets are sent off downlink.

Based on these two independent congestion control algorithms for the first data packet transport domain 130 and the second data packet transport domain 140, the server 120 may determine the sending of downlink data packet based on the more stringent of the two congestion controls.

Referring to FIG. 3, this figure shows the negative case if a data packet is lost in domain 1.

Furthermore it is to be noted that the following flows are simplified in the sense that delays in the routing of data packets are not reflected for brevity. In a real implementation these must be considered in the logic of the flows. So when a proxy receives a data packet N without having received data packet N-1 before, this may be caused by the fact that data packet N-1 was lost, or due to a delay in routing or simply because data packet N-1 was routed via a different/longer path than data packet N. So before concluding that data packet N-1 was lost, certain time of waiting (e.g. controlled by a timeout) would be required. So the focus in the following flows is to highlight the main logic and negative, error, or fault cases are omitted.

The flow starts in step 310 where the server 120 sends off a data packet N-1 to the client 100. In this flow we assume that this data packet N-1 is lost somewhere within domain 1 130, so the data packet N-1 is not received by the proxy 110, and consequently, there is also no positive acknowledgement produced by the proxy 110. Since lost, there are no further events related to data packet N-1.

In step 320 the server 120 would continue to send downlink data packets and would sent off data packet N (the next in sequence) toward the client 100. Here it is assumed that data packet N is received by the proxy 110.

The proxy 110 would the immediately forward the received data packet N towards the client 100. The proxy 110 may, when receiving a data packet N, determine that the proxy 110 has not sent any acknowledgement for data packet N-1. So the proxy 110 would then send in step 330 a positive acknowledgment for data packet N and a negative acknowledgement for data packet N-1 to the server 120.

The negative acknowledgement for data packet N−1 would indicate to the server 120 a failure to receive the data packet at the proxy 110 and is denoted as "proxy nack (N−1)" so a negative acknowledgement for data packet N−1. Both acknowledgements of step 330 may be sent in a single response message, or by alternative, each acknowledgement may be sent in an own message to the server 120 (not shown in the figure).

So an acknowledgement is sent to the server 120 on the failure to receive the data packet in case the proxy 110 receives a data packet marked as not the next in the sequence of data packets within the established connection. For example, the proxy 110 may receive a data packet N and according to the own logging information of acknowledged data packets the last acknowledged data packet may be any data packet previous in sequence to packet N, so e.g. N−4. In this case the proxy 110 would acknowledge data packet N, and negatively acknowledge data packets N−1, N−2, and N−3.

After forwarding the data packet N and sending the acknowledgements to the server 120, the proxy 110 may delete the received data packet N in the proxy 110. Still the proxy 110 will track the acknowledgements send to the server 120, e.g. by logging the sequence numbers of the acknowledged data packets.

Based on the acknowledgements received by the server 120 in step 330, the server 120 can determine in step 340 that data packet N−1 failed in domain 1 130 and data packet N passed domain 1 130.

The data packet N then reaches the client 100. The client 100 will then, in step 350, acknowledge the reception of data packet N, and also send a negative acknowledgement for data packet N−1.

The acknowledgements are routed via transport domain 1 and transport domain 2 to the server 120. It shall be noted that also here due to the routing algorithm, the acknowledgement may traverse a different proxy than the proxy 110, since there may be more than one proxy between the two data packet transport domains 130, 140. For simplicity reasons the figures show the case that the acknowledgement traverses the proxy 110 on the way back to the server 120. Also here the acknowledgements pass the proxy 110 transparently, so unchanged and without the proxy 110 taking any actions on this event.

Finally the acknowledgements are received by the server 120. In step 350 the server 120 can then draw the final conclusion on the delivery status of the data packet N and N−1 based on the received acknowledgements. Since the server 120 received a positive acknowledgement from the proxy 110 and a positive acknowledgement from the client 100, the data packet N has successfully passed both domains 130, 140. For data packet N−1 the server 120 received negative acknowledgements from the proxy 110 and from the client 100. This means that the data packet N−1 has failed already in domain 130.

Based on this finding the server 120 may adjust its two independent congestion control algorithms for the first data packet transport domain 130 and the second data packet transport domain 140. The server 120 may determine the sending of downlink data packet based on the more stringent of the two congestion controls, which is in this case would be the congestion control for domain 1 130.

Referring to FIG. 4, this figure shows the negative case if a data packet is lost in domain 2.

The flow starts in step 410 where the server 120 sends off a data packet N−1 to the client 100. The proxy 110 receives the data packet N−1 and immediately forwards the data packet N−1 in step 420 unmodified towards the client 100 across the transport network of the domain 2 140.

In this flow it is assumed that the data packet N−1 is lost in domain 2, so does not reach the client 100.

In step 430 the proxy 110 sends an acknowledgement to the server 120 acknowledging the reception of the data packet N−1. The proxy 110 would then delete its local copy of the data packet N−1. The server 120 receives this acknowledgement for data packet N−1.

In step 440 the server can, based on this acknowledgement received from the proxy 110, derive that the data packet N−1 has successfully passed the domain 1 130.

In step 450 the server 120 would continue to send downlink data packet and would sent off data packet N toward the client 100. The data packet N is received by the proxy 110. The proxy 110 would then immediately forward the received data packet N towards the client 100 and acknowledge, in step 460, the reception of data packet N to the server 120. In step 470 the server can, based on this acknowledgement received from the proxy 110, derive that the data packet N has successfully passed the domain 1 130.

It is assumed in this flow, that the client 100 receives the data packet N. Consequently, the client 100 will acknowledge in step 480 reception of data packet N and negatively acknowledge data packet N−1. These acknowledgements are routed to the server 120 (via the proxy 110 or via an alternative path).

Receiving the acknowledgement for data packet N and the negative acknowledgement for data packet N−1, the server can in step 490 determine that data packet N was successfully delivered to the client 100, while the data packet N−1 was lost in domain 2 140.

Based on this finding the server 120 may adjust its two independent congestion control algorithms for the first data packet transport domain 130 and the second data packet transport domain 140. The server 120 may determine the sending of downlink data packet based on the more stringent of the two congestion controls, which is in this case would be the congestion control for domain 2 140.

By alternative, the server 120 may consider that transport domain 2 140 may provide downlink resource sharing among different downlink data packet flows. In this case the server 120 may apply a different action, or that same action but to a higher or lower degree.

In order for the server 120 to apply the most efficient congestion control action based on a trigger to apply congestion control, it would be beneficial for the server 120 to have a more detailed knowledge on the transport characteristics or an applied resource sharing algorithm.

Since the proxy 110 is located in-between both transport domains 130, 140, the proxy has one interface with the second transport domain 140 and may obtain information on transport characteristics of the second data packet transport domain 140 from a user plane handling node of the second data packet transport domain 140.

Having obtained such information on transport characteristics of the second data packet transport domain 140, the proxy 110 may send this obtained information on transport characteristics of the second data packet transport domain 140 to the server 120. The proxy 110 may utilize a new message from the proxy 110 to the server 120 to deliver that information, or by alternative the proxy 110 may add such information to one or more data packet acknowledgements send anyway to the server 120.

The transport characteristics of the second data packet transport domain 140 comprise information on an available bandwidth in the second data packet transport domain 140.

For example, the proxy 110 may be co-located with or integrated in a node of the second data packet transport domain 140 and by that have direct access to such transport characteristic information. By alternative, the proxy 110 may be able to communicate via signaling with nodes of the second data packet transport domain 140 to query such transport characteristic information. In yet another alternative, such transport characteristic information may be administered in the proxy 110 by administrative means (such as operation and maintenance commands or interface).

In an embodiment, the second data packet transport domain 140 may be a radio access network such as LTE RAN. In this case the proxy 110 may query such transport characteristic information from an eNB of that LTE RAN, or the proxy 110 may be co-located with or integrated in a packet gateway node of such LTE RAN.

Figure 5:
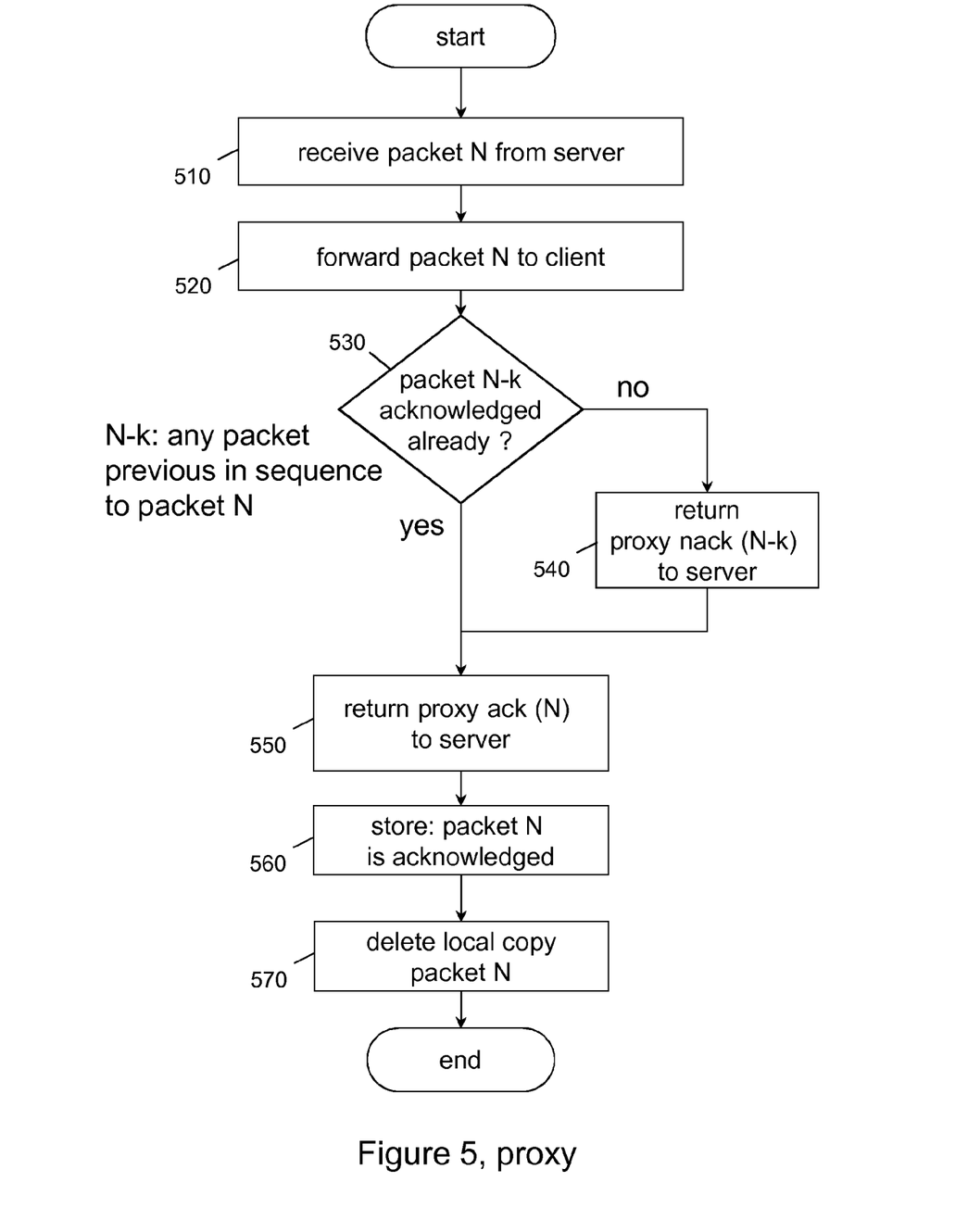
FIG. 5 shows a block flow diagram illustrating the behavior of a proxy.

Referring to FIG. 5, this figure shows a block flow diagram illustrating the behavior of a proxy node such as proxy 110.

The flow starts in step 510 when the proxy 110 receives a data packet from a server 120. This data packet is denoted as N, meaning that the data packet carries sequence number of N. Consequently, a data packet denoted as N+1 would be the next data packet in the sequence, or a data packet denoted as N−1 would be the previous data packet in such sequence. The data packet N is then received by the proxy 110.

In step 520 the data packet N is forwarded to the client 100.

The proxy 110 may generate a local copy of the data packet for generating the acknowledgement to the server 120. This ensures that a received data packet is immediately forwarded, so the forwarding delay caused by the proxy 110 would be minimized. Any handling of the acknowledgement may then be based on this local copy of the received data packet. This local copy may be produced within the proxy 110 by simple copying or mirroring of the received data packet, or by doing an optical split of the downlink data packet stream where the one optical split result is forwarded and the second optical result of the split would be used for local analysis and generation of acknowledgments.

In step 530 the proxy 110 checks whether all packets previous in sequence to packet N (here denoted as N−k, where k>=1) have been acknowledged already. If the answer is yes, so all packets previous in sequence to packet N have been acknowledged already, the flow continues in step 550.

If the answer is no, so not all packets previous in sequence to packet N have been acknowledged already, the flow continues in step 540. In this step 540 a negative acknowledgement for each of the packets previous in sequence to packet N is returned to the server 120. This may be done within one message comprising all negative acknowledgements, or a single negative acknowledgement per message. The proxy 110 may store locally information on which data packets have been negatively acknowledged to the server 120.

In step 550, all packets previous in sequence to packet N have been acknowledged already, either positively or negatively. The proxy 110 then returns a positive acknowledgement for data packet N to the server 120.

In step 560 the proxy 110 stores locally information that data packet N has been acknowledged to the server 120 in order to keep track on which data packets have already been acknowledged. This is needed in order to determine if a data packet was lost in domain 1 between the server 120 and the proxy 110.

In step 570 the proxy 110 deletes, after sending of the acknowledgement to the server 120 and forwarding the received data packet to the client 100, the received data packet N in the proxy 110. So except the tracking of acknowledgements, no information on the data packet N is kept in the proxy 110. This allows saving a significant amount of memory resources in a proxy 110 implementation.

Then the flow ends.

Figure 6A:
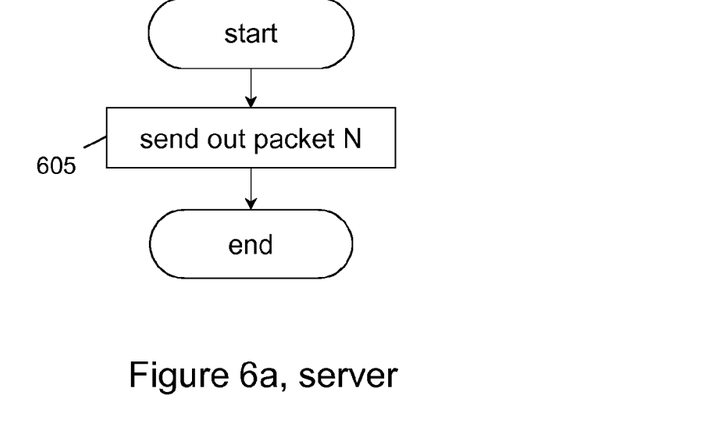
FIGS. 6a-c show a block flow diagram illustrating the behavior of a server.

Referring to FIG. 6a, this figure shows show a block flow diagram illustrating the behavior of a server, for example a server 120.

This flow is triggered when the server 120 determines that a data packet shall be sent off. In step 605 the data packet N is sent off towards the client 100.

The server 120 has to log the sending of a data packet in order to control the rate of sending packets, or by alternative, the number of parallel data packets in flight within a given time window.

Then the flow ends.

Figure 6B:
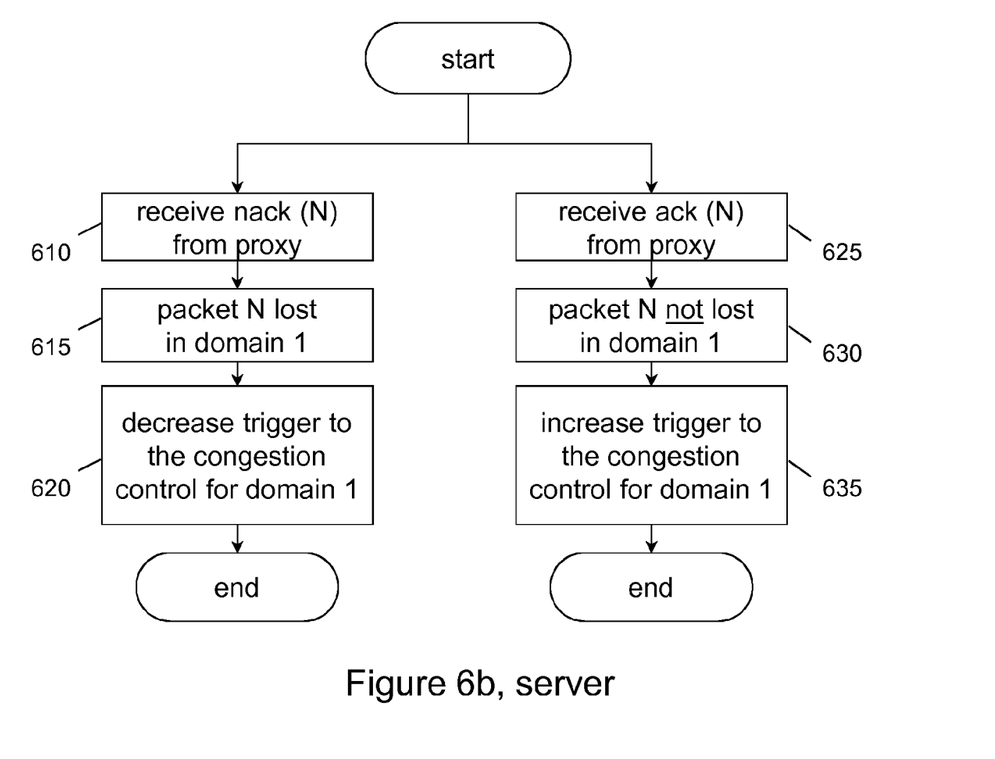

Referring to FIG. 6b, this figure shows a block flow diagram illustrating the behavior of a server, for example a server 120.

This block flow illustrates the server 120 actions in case a feedback is received from a proxy 110 in response to sending out a data packet as shown in FIG. 6a.

Figure 8:
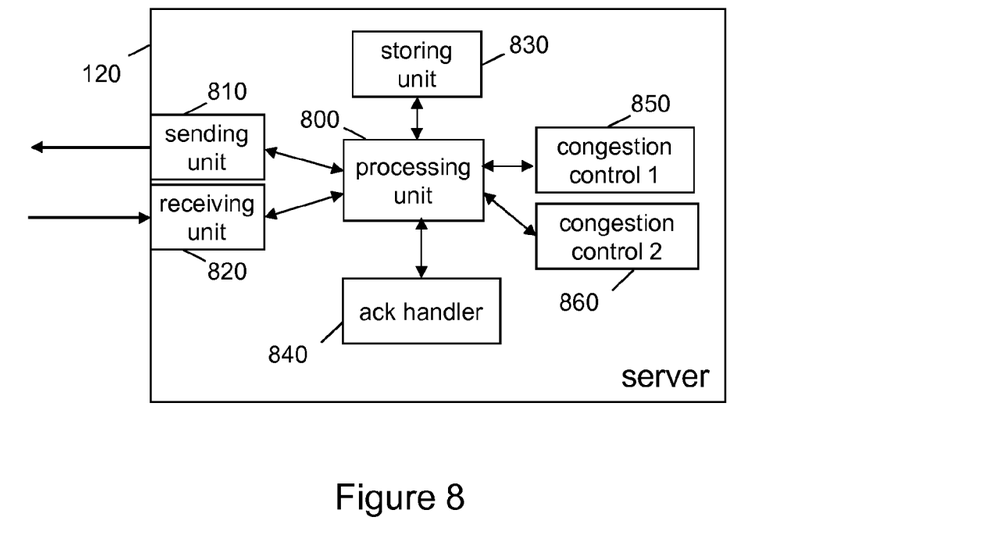
FIG. 8 shows a schematic block diagram illustrating a server node.

In step 610 the flow starts with a reception of a negative acknowledgement from the proxy 110 for data packet N, here denoted as "nack (N)". In step 615 the server 120 derives based on this negative acknowledgement that the data packet N was lost within packet transport domain 1 130. The server 120 then in step 620 generates a "decrease trigger" and informs the congestion control algorithm responsible for packet transport domain 1 130, e.g. congestion control 1 850 as depicted in FIG. 8.

Based on this "decrease trigger" the congestion control algorithm may then reduce the rate of sending packets, or by alternative, the number of parallel data packets in flight within a given time window. Then the flow ends.

In step 625 the flow starts with a reception of a positive acknowledgement from the proxy 110 for data packet N, here denoted as "ack (N)". In step 630 the server 120 derives based on this positive acknowledgement that the data packet N successfully passed packet transport domain 1 130. The server 120 then in step 635 generates an "increase trigger" and informs the congestion control algorithm responsible for packet transport domain 1 130, e.g. congestion control 1 850 as depicted in FIG. 8.

Base on this "increase trigger" the congestion control algorithm may then increase the rate of sending packets, or by alternative, the number of parallel data packets in flight within a given time window. Then the flow ends.

Figure 6C:
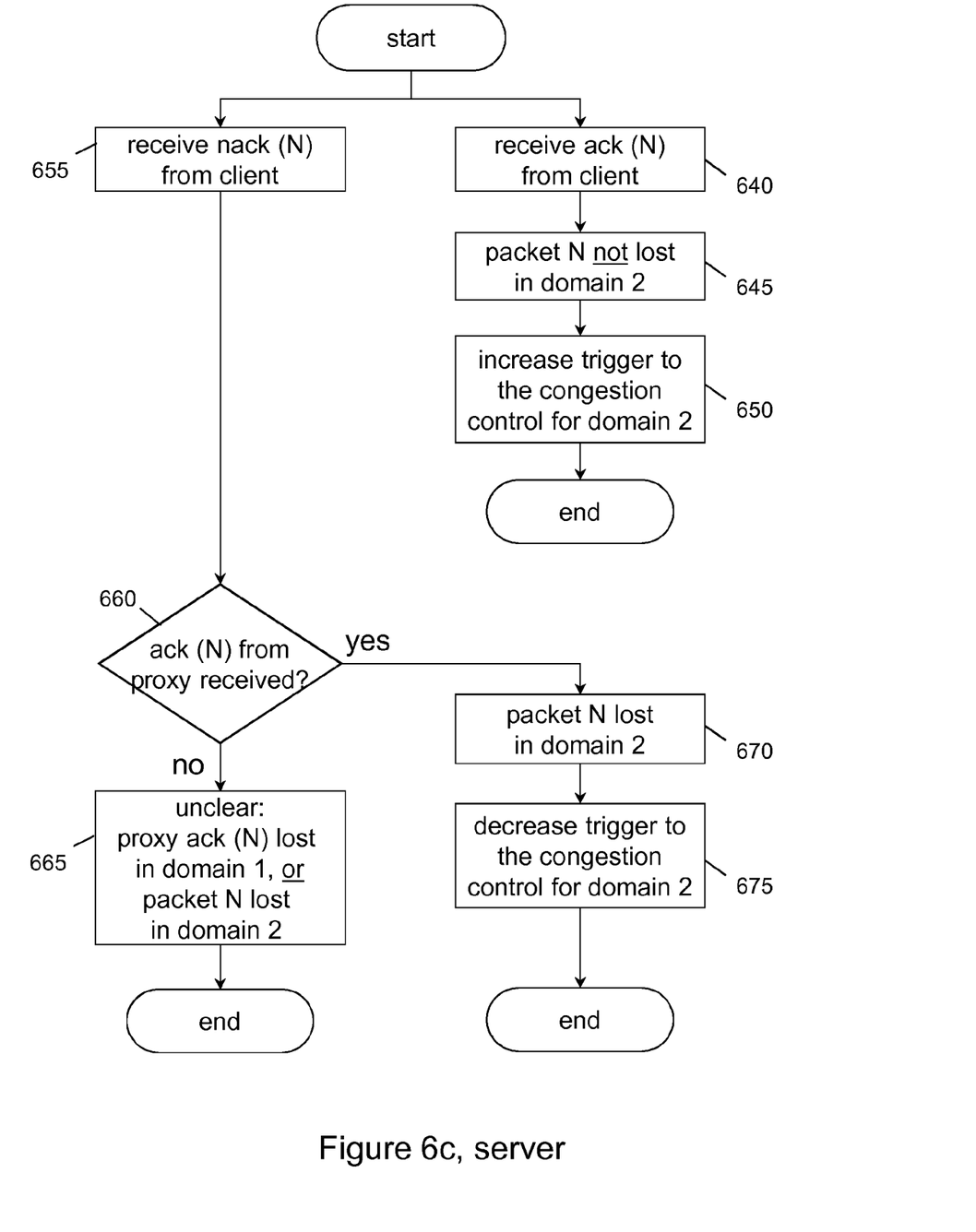

Referring to FIG. 6c, this figure shows a block flow diagram illustrating the behavior of a server, for example a server 120.

This block flow illustrates the server 120 actions in case a feedback is received from a client 100 in response to sending out a data packet as shown in FIG. 6a.

In step 640 the flow starts with a reception of a positive acknowledgement from the client 100 for data packet N, here denoted as "ack (N)". In step 645 the server 120 derives based on this positive acknowledgement that the data packet N successfully passed packet transport domain 2 140. The server 120 then in step 650 generates an "increase trigger" and informs the congestion control algorithm responsible for packet transport domain 2 140, e.g. congestion control 2 860 as depicted in FIG. 8.

The congestion control algorithm may then increase the rate of sending packets, or by alternative, the number of parallel data packets in flight within a given time window. Then the flow ends.

In step 655 the flow starts with a reception of a negative acknowledgement from the client 100 for data packet N, here denoted as "nack (N)". The server 120 then checks in step 660 whether a positive acknowledgement from the proxy 110 for data packet N has been received before, "ack (N)". If the answer to this check is no, there was no positive acknowledgement from the proxy 110 for data packet N before, then the flow continues in step 665.

In step 665 the server 120 has not enough information, or contradicting information was received. Here the client 110 has not received the data packet N, but there was no positive acknowledgement received from the proxy 110. This may happen for example if the positive acknowledgement from the proxy 110 was lost in packet transport domain 1 130, or by alternative, the data packet N was lost in packet transport domain 2 140. Since no fault location can be determined in this case, no further action is taken by the server 120 and the flow ends.

If the answer to the check in step 660 is yes, there was a positive acknowledgement from the proxy 110 for data packet N before, the flow continues in step 670.

In step 670 the server 120 derives based on this negative acknowledgement that the data packet N was lost in packet transport domain 2 140. The server 120 then in step 675 generates a "decrease trigger" and informs the congestion control algorithm responsible for packet transport domain 2 140, e.g. congestion control 2 860 as depicted in FIG. 8.

The congestion control algorithm may then decrease the rate of sending packets, or by alternative, the number of parallel data packets in flight within a given time window. Then the flow ends.

Figure 7:
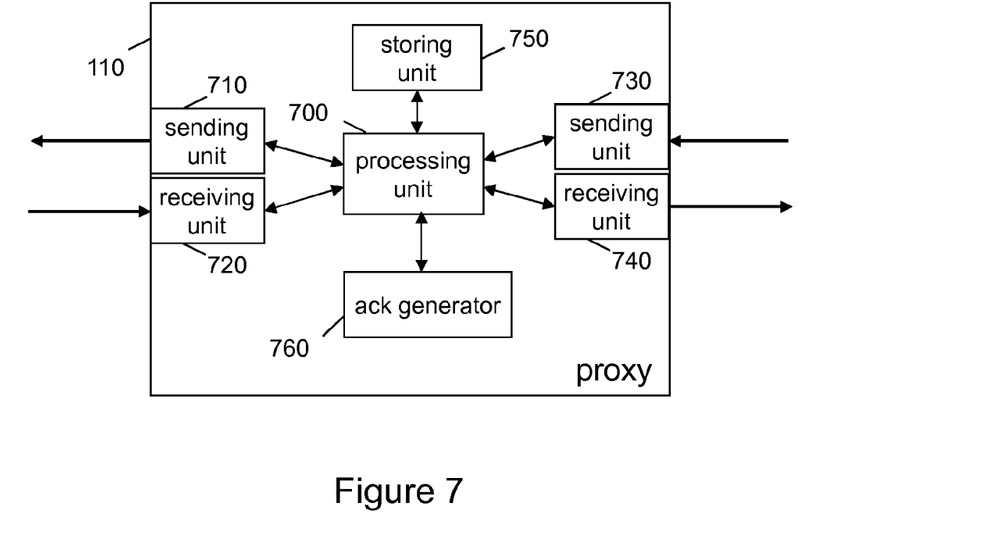
FIG. 7 shows a schematic block diagram illustrating a proxy node.

Referring to FIG. 7, this figure shows a schematic block diagram illustrating a proxy node. The illustrated entity may correspond to the proxy 110. The proxy 110 may be adapted to perform one or more steps of the above described method shown in FIG. 5. The proxy 110 may also be a virtual network function (VNF), e.g. instantiated by a VNF manager.

The proxy 110 may comprise a number of functional units, which are described in further detail below and which are adapted to perform respective method steps.

A processing unit 700 of the proxy 110 may be adapted to execute a method for receiving a data packet from a server 120 and sending, responsive to the reception of the data packet, an acknowledgement to the server 120 acknowledging the reception of the data packet or a failure to receive the data packet at the proxy 110. The proxy 110 may further forward the received data packet to the client 100 and delete, after sending of the acknowledgement to the server 120 and forwarding the received data packet to the client 100, the received data packet in the proxy 110. These steps may also be performed in cooperation with the other functional elements of the proxy 110 as shown in FIG. 7.

In a practical implementation the processing unit 700 may be one processor taking care of all the above functions, or may also be distributed over more than one processor, wherein the functions may be distributed over the available processors.

The proxy 110 may further comprise sending units 710, 730 and receiving units 720, 740 via which the proxy 110 can communicate with other network entities such as the server 120 or the client 100. The sending units 710, 730 may send out signaling messages composed by the processing unit 700. The receiving units 720, 740 may receive signaling messages from those external entities above and forward the received signaling messages to the processing unit 700 for decoding and/or dispatching. As shown, in a practical implementation, there may be more than one sending/receiving unit, e.g. serving different interfaces. By alternative, a single sending/receiving unit may be used as well.

The proxy 110 may also comprise a storing unit 750 for storing information related to handling of transfer of downlink data packets from a server to a client via a proxy node. The storing unit 750 may store information related to the configuration and status of acknowledgement of data packets. The storing unit 750 may be a pure software functional module such as a SQL database software module. The storing unit 750 may also have access to and/or use a centralized storage (e.g. a Network Attached Storage, NAS). The storing unit 750 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 750 may be used by the processing unit 700 to store information, for example program code or data related to proxy tasks.

The proxy 110 may also comprise an "ack" (acknowledgement) generator module 760 for generating acknowledgements towards the server 120. These may be positive acknowledgements provided towards the server 120 if a data packet was received at the proxy 110. These may be negative acknowledgements reported towards the server 120 that a data packet in the sequence of data packets was missed at the proxy 110. In order to determine missing data packets, the proxy 110 may log the recent sequence numbers of data packets received from the server 120 on this connection. The "ack" generator module 760 may also utilize the storing unit 750 to store such information.

In addition (not depicted in the figure), the proxy 110 may also comprise a data packet splitter for duplicating a data packet received via receiving units 720, 740. The original data packet may then be forwarded to the client 100 straight away (via sending units 710, 730), while the duplicated copy of the data packet would be kept in a local storage such as the storing unit 750 until the forwarding is completed and an acknowledgement is generated by the "ack" generator module 760 and sent to the server 120 (also via one of the via sending units 710, 730). Afterwards the proxy 110 may delete that duplicated copy of the data packet, e.g. by informing the storing unit 750 on this deletion.

Referring to FIG. 8, this figure shows a schematic block diagram illustrating a server node. The illustrated entity may correspond to the server 120. The server 120 may be adapted to perform one or more steps of the above described method shown in FIG. 6a-c. The server 120 may also be a virtual network function (VNF), e.g. instantiated by a VNF manager.

The server 120 may comprise a number of functional units, which are described in further detail below and which are adapted to perform respective method steps.

A processing unit 800 of the server 120 may be adapted to execute a method for sending a data packet to the client 100 and determining a delivery status of the data packet or a failure location in either of the two data packet transport domains 130, 140, based on acknowledgements received from the client 100 and/or the proxy 110. These steps may also be performed in cooperation with the other functional elements of the server 120 as shown in FIG. 8.

In a practical implementation the processing unit 800 may be one processor taking care of all the above functions, or may also be distributed over more than one processor, wherein the functions may be distributed over the available processors.

The server 120 may further comprise a sending unit 810 and a receiving unit 820 via which the server 120 can communicate with other network entities such as the proxy 110 or the client 100. The sending unit 810 may send out signaling messages composed by the processing unit 800. The receiving unit 820 may receive signaling messages from those external entities above and forward the received signaling messages to the processing unit 800 for decoding and/or dispatching. In a practical implementation, there may be more than one sending/receiving unit, e.g. serving different target interfaces.

The server 120 may also comprise a storing unit 830 for storing information related to handling of transfer of downlink data packets from a server to a client via a proxy node. The storing unit 750 may store information related to the configuration and status of acknowledgement of data packets and derived information in which of the transport domains 130, 140 a data packet loss has occurred. The storing unit 830 may be a pure software functional module such as a SQL database software module. The storing unit 830 may also have access to and/or use a centralized storage (e.g. a Network Attached Storage, NAS). The storing unit 830 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 830 may be used by the processing unit 800 to store information, for example program code or data related to server tasks.

The server 120 may also comprise an "ack" (acknowledgement) handler module 840 for handling acknowledgements received from the client 100 and/or the proxy 110. These may be positive acknowledgements received from the proxy 110 if a data packet was received at the proxy 110. These may be negative acknowledgements received at the server 120 that a data packet in the sequence of data packets was missed at the proxy 110. In addition, or by alternative, these may be positive acknowledgements received from the client 100 if a data packet was received at the client 100. These may also be negative acknowledgements received from the client 100 if a data packet was not received at the client 100. Based on these acknowledgements, the "ack" handler module 840 may determine in which of the data packet transport domains 130, 140 a loss of the data packet occurred. The "ack" handler module 840 may then send corresponding "increase"- or "decrease"-triggers to the respective congestion control algorithm handler modules 850, 860.

The server 120 may further comprise congestion control algorithm handler modules 850, 860, wherein each of these congestion control handler modules 850, 860 is associated to one of the data packet transport domains 130, 140. These two congestion control handler modules 850, 860 would handle the congestion control algorithm separately for the first and the second data packet transport domains 130, 140. The two congestion control handler modules 850, 860 may receive triggers from the "ack" handler module 840 to increase or decrease the data packet sending speed. A data packet sending speed may be increased or decreased by changing the data packet rate accordingly or by increasing or decreasing the number of parallel data packet in flight.

In addition (not depicted in the figure), the server 120 also comprises an application logic or a service implementation as such that the client would be accessing or using. This application logic or the service has no bearing on the above described features as any of these application logics or services can be broken down into a sequence of data packets that have to be delivered from the server 120 to the client 100 and vice versa.

According to another embodiment, a computer program is provided. The computer program may be executed by the processing units 700 or 800 of the above mentioned entities 110 or 120 respectively such that a method for handling of transfer of downlink data packets from a server to a client via a proxy node as described above with reference to FIG. 5 or 6*a-c* may be carried out or be controlled. In particular, the entities 110 or 120 may be caused to operate in accordance with the above described method by executing the computer program.

The computer program may be embodied as computer code, for example of a computer program product. The computer program product may be stored on a computer readable medium, for example a disk or the storing unit 750 or 830 of the entities 110 or 120, or may be configured as downloadable information.

One or more embodiments as described above may enable at least one of the following technical effects:
- since the proxy does not terminate the end-to-end connection, the end-to-end semantics between the server and the client is kept
- low complexity (buffering, processing, encryption) requirements in the proxy
- does not require two layers of encryption to ensure privacy of end-to-end communication
- congestion control is kept in the server and can be aligned with the application needs and the need of the transport domains
- enables to deploy radio access networks that assume different congestion control algorithm than the one used in the Internet domain Modifications and other embodiments of the disclosed invention will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for transfer of downlink data packets from a server to a client across at least one first data packet transport domain and at least one second data packet transport domain, the two data packet transport domains having different transport characteristics and being interconnected via at least one proxy, the server being located in front of the first data packet transport domain and the client being located behind the second data packet transport domain, the method comprising:
    sending, by the server, a data packet to the client;
    sending, by the proxy and responsive to the reception of the data packet, an acknowledgement to the server acknowledging the reception of the data packet or a failure to receive a prior data packet at the proxy;
    forwarding, by the proxy, the received data packet to the client;

deleting, by the proxy, after sending of the acknowledgement to the server and forwarding the received data packet to the client, the received data packet in the proxy;

determining, by the server, a delivery status of the data packet or a failure location in either of the two data packet transport domains, based on acknowledgements received from the client and/or the proxy; and wherein the transport characteristics of the two data packet transport domains differ at least in one of a data packet loss ratio and an available bandwidth.

2. The method of claim 1, wherein the transfer of the data packets from the server to the client is done within a connection established via a connection establishment protocol between the server and the client.

3. The method of claim 1, wherein the second data packet transport domain provides downlink resource sharing among different downlink data packet flows.

4. The method of claim 1, further comprising, maintaining, by the server, an independent congestion control for downlink data packets for the first data packet transport domain and the second data packet transport domain.

5. The method of claim 4, further comprising, determining, by the server, based on the acknowledgements received from the client and/or the proxy, an input to at least one of the two congestion controls.

6. The method of claim 5, wherein the congestion control is a window based congestion control algorithm or a rate based congestion control algorithm.

7. The method of claim 5, further comprising determining, by the server, the sending of downlink data packet based on a more stringent of the two congestion controls.

8. A method, in a server, for transfer of downlink data packets from the server to a client across at least one first data packet transport domain and at least one second data packet transport domain, the two data packet transport domains having different transport characteristics and being interconnected via at least one proxy, the server being located in front of the first data packet transport domain and the client being located behind the second data packet transport domain, the method comprising the server:

sending a data packet to the client;

determining a delivery status of the data packet or a failure location in either of the two data packet transport domains, based on acknowledgements received from the client and/or the proxy; and wherein the transport characteristics of the two data packet transport domains differ at least in one of a data packet loss ratio and an available bandwidth.

9. The method of claim 8, wherein the transfer of the data packets from the server to the client is done within a connection established via a connection establishment protocol.

10. The method of claim 8, wherein the second data packet transport domain provides downlink resource sharing among different downlink data packet flows.

11. The method of claim 8, further comprising, maintaining, by the server, an independent congestion control for downlink data packets for the first data packet transport domain and the second data packet transport domain.

12. The method of claim 11, further comprising, determining, by the server, based on the acknowledgements received from the client and/or the proxy, an input to at least one of the two congestion controls.

13. The method of claim 12, wherein the congestion control is a window based congestion control algorithm or a rate based congestion control algorithm.

14. The method of claim 12, further comprising determining, by the server, the sending of downlink data packet based on the more stringent of the two congestion controls.

15. A method, in a proxy, for transfer of downlink data packets from a server to a client across at least one first data packet transport domain and at least one second data packet transport domain, the two data packet transport domains having different transport characteristics and being interconnected via the at least one proxy, the server being located in front of the first data packet transport domain and the client being located behind the second data packet transport domain, the method comprising the proxy:

receiving a data packet from the server;

sending, responsive to the reception of the data packet, an acknowledgement to the server acknowledging the reception of the data packet or a failure to receive a prior data packet at the proxy;

forwarding the received data packet to the client;

deleting, after sending of the acknowledgement to the server and forwarding the received data packet to the client, the received data packet in the proxy; and wherein the proxy generates a local copy of the data packet for generating the acknowledgement to the server.

16. The method of claim 15, wherein the transfer of the data packets from the server to the client is done within a connection established via a connection establishment protocol between the server and the client.

17. The method of claim 16, wherein the proxy is transparent to the data packets sent by the connection establishment protocol.

18. The method of claim 16, wherein an acknowledgement is sent to the server on the failure to receive the prior data packet in case the proxy receives a data packet marked as not the next in the sequence of data packets within the established connection.

19. The method of claim 15, further comprising, the proxy obtaining information on transport characteristics of the second data packet transport domain from a user plane handling node of the second data packet transport domain.

20. The method of claim 19, further comprising, the proxy sending the obtained information on transport characteristics of the second data packet transport domain to the server.

21. The method of claim 20, wherein the transport characteristics of the second data packet transport domain comprise information on an available bandwidth in the second data packet transport domain.

22. A server for transfer of downlink data packets from the server to a client across at least one first data packet transport domain and at least one second data packet transport domain, the two data packet transport domains having different transport characteristics and being interconnected via at least one proxy, the server being located in front of the first data packet transport domain and the client being located behind the second data packet transport domain, the server comprising:

processing circuitry;

memory containing instructions executable by the processing circuitry whereby the server is operative to:

send a data packet to the client;

determine a delivery status of the data packet or a failure location in either of the two data packet transport domains, based on acknowledgements received from the client and/or the proxy; and wherein the transport characteristics of the two data packet transport domains differ at least in one of a data packet loss ratio and an available bandwidth.

23. A proxy for transfer of downlink data packets from a server to a client across at least one first data packet transport domain and at least one second data packet transport domain, the two data packet transport domains having different transport characteristics and being interconnected via the at least one proxy, the server being located in front of the first data packet transport domain and the client being located behind the second data packet transport domain, the proxy comprising:

processing circuitry;

memory containing instructions executable by the processing circuitry whereby the proxy is operative to:

receive a data packet from the server;

send, responsive to the reception of the data packet, an acknowledgement to the server acknowledging the reception of the data packet or a failure to receive a prior data packet at the proxy;

forward the received data packet to the client;

delete, after sending of the acknowledgement to the server and forwarding the received data packet to the client, the received data packet in the proxy; and         wherein the proxy generates a local copy of the data packet for generating the acknowledgement to the server.

\* \* \* \* \*